US010113510B2

(12) United States Patent
Saleri

(10) Patent No.: US 10,113,510 B2
(45) Date of Patent: Oct. 30, 2018

(54) VALVE FOR METHANE IN AUTOMOTIVE SYSTEMS WITH BY-PASS SYSTEM OF THE EXCESS FLOW BLOCKING DEVICE

(71) Applicant: OMB SALERI S.p.A., Brescia (IT)

(72) Inventor: Paride Saleri, Brescia (IT)

(73) Assignee: OMB SALERI S.p.A., Brescia (IT)

( * ) Notice: Subject to any disclaimer, the term of this patent is extended or adjusted under 35 U.S.C. 154(b) by 268 days.

(21) Appl. No.: 15/029,454

(22) PCT Filed: Oct. 15, 2014

(86) PCT No.: PCT/IB2014/065322
§ 371 (c)(1),
(2) Date: Apr. 14, 2016

(87) PCT Pub. No.: WO2015/056184
PCT Pub. Date: Apr. 23, 2015

(65) Prior Publication Data
US 2016/0273492 A1 Sep. 22, 2016

(30) Foreign Application Priority Data

Oct. 18, 2013 (IT) .............................. BS2013A0146

(51) Int. Cl.
F16K 31/12 (2006.01)
F02M 21/02 (2006.01)
(Continued)

(52) U.S. Cl.
CPC .... *F02M 21/0239* (2013.01); *F02M 21/0209* (2013.01); *F16K 1/305* (2013.01); *F16K 1/307* (2013.01); *F16K 17/20* (2013.01); *F16K 17/34* (2013.01); *F16K 17/38* (2013.01); *F16K 27/02* (2013.01); *F16K 31/02* (2013.01);
(Continued)

(58) Field of Classification Search
CPC ............... F02M 21/02; F02M 21/0239; F02M 21/0209; F16K 1/305; F16K 1/307; F16K 27/02; F16K 31/02; F16K 31/60; F16K 17/20; F16K 17/34; F16K 17/38; Y02T 10/32; Y10T 137/7785; Y10T 137/7724; Y10T 137/7737; Y10T 137/1963
See application file for complete search history.

(56) References Cited

U.S. PATENT DOCUMENTS 6,041,762 A * 3/2000 Sirosh .................. B60K 15/013
123/529
7,628,137 B1 * 12/2009 McAlister ............ F02M 21/026
123/297

(Continued)

FOREIGN PATENT DOCUMENTS

EP 0 957 299 A1 11/1999
EP 1 593 823 A1 11/2005

OTHER PUBLICATIONS

International Search Report for corresponding International Patent Application No. PCT/IB2014/065322 dated Feb. 16, 2015.
(Continued)

Primary Examiner — Jessica Cahill
(74) Attorney, Agent, or Firm — Merchant & Gould P.C.

(57) ABSTRACT

A valve (1) controlling flow of methane gas in automotive systems includes a feed duct (30) of the gas to the delivery duct (20); having a by-pass duct (32) delimited by a by-pass duct (34) internal to the tank duct (6), to limit the overall dimensions in the attachment area to the tank.

13 Claims, 6 Drawing Sheets

(51) Int. Cl.
   *F16K 1/30*    (2006.01)
   *F16K 17/20*   (2006.01)
   *F16K 17/38*   (2006.01)
   *F16K 17/34*   (2006.01)
   *F16K 27/02*   (2006.01)
   *F16K 31/02*   (2006.01)
   *F16K 31/60*   (2006.01)

(52) U.S. Cl.
   CPC ............... *F16K 31/60* (2013.01); *Y02T 10/32* (2013.01); *Y10T 137/7724* (2015.04); *Y10T 137/7785* (2015.04)

(56) References Cited

U.S. PATENT DOCUMENTS

| | | | |
|---|---|---|---|
| 2004/0045539 A1 | 3/2004 | Furuta et al. | |
| 2005/0241623 A1* | 11/2005 | Ricco | F02M 21/0239 123/527 |
| 2005/0241624 A1* | 11/2005 | Ricco | F02M 21/0239 123/527 |
| 2005/0241625 A1* | 11/2005 | Ricco | F02M 21/0239 123/527 |
| 2009/0272441 A1* | 11/2009 | Sasaki | F01P 7/16 137/468 |
| 2013/0277587 A1* | 10/2013 | Zieger | F16K 31/0651 251/129.15 |
| 2017/0074212 A1* | 3/2017 | Lorts | F02D 19/0607 |

OTHER PUBLICATIONS

Italian Search Report for corresponding Italian Patent Application No. BS2013A000146 dated Jun. 25, 2014.

\* cited by examiner

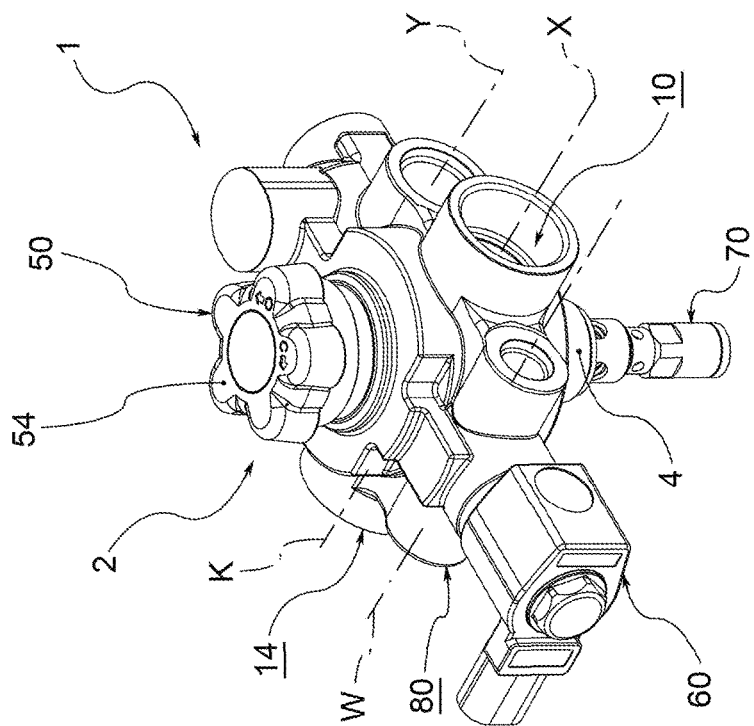
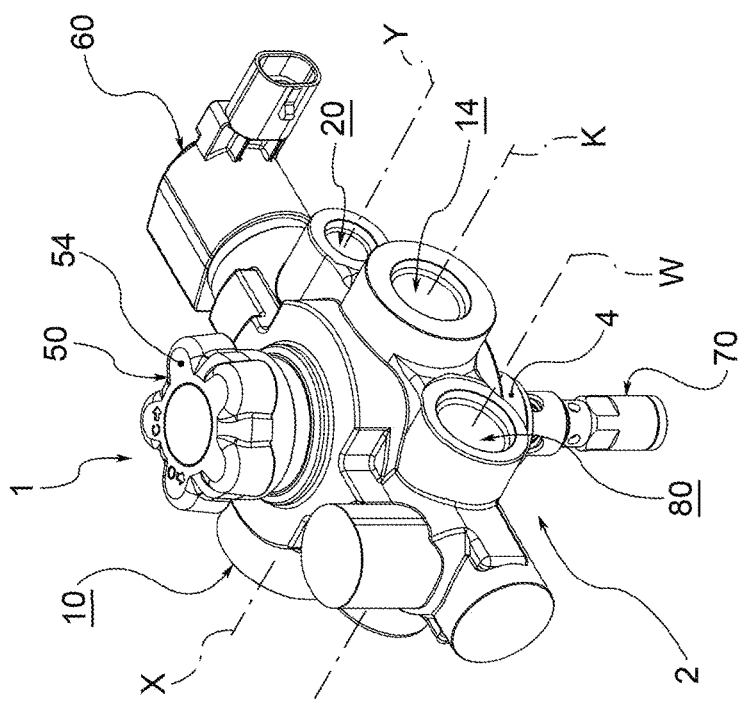
FIG.1
FIG.2

VALVE FOR METHANE IN AUTOMOTIVE SYSTEMS WITH BY-PASS SYSTEM OF THE EXCESS FLOW BLOCKING DEVICE

This application is a National Stage Application of PCT/IB2014/065322, filed 15 Oct. 2014, which claims benefit of Serial No. BS2013A00046, filed 18 Oct. 2013 in Italy, and which applications are incorporated herein by reference. To the extent appropriate, a claim of priority is made to each of the above disclosed applications.

The object of the present invention is a valve applicable to a tank, usually on board a vehicle, for flow controlling of methane gas in automotive systems.

As is known, such valves are provided both with the components for carrying out the usual valve functions of supply of methane to the tank and of delivery of the methane to the vehicle engine, and with numerous accessory devices which for example carry out safety functions.

For example, valves are known which are provided with thermal safety devices which, in case of fire and consequent increase of the ambient temperature beyond a threshold identified by the regulations, provide to open a passage which allows the quick discharge of the methane to the external environment, to prevent the explosion of the tank.

Valves for methane are also known which are provided with an excess flow blocking device which, in case of an increase in the flow rate of methane that escapes from the delivery to the engine, for example due to a failure of the piping downstream of the valve, blocks the methane flow towards the delivery.

Currently, in the field of valves for methane, the need is felt to have valves that can control very large tanks, such as intended for commercial vehicles, industrial vehicles and the like.

For such valves, it is necessary to provide technical solutions that allow a quick emptying of the tank, for example in case of fire, because of the large amounts of methane contained in the tank.

In these conditions, during the quick emptying by the actuation of the thermal safety device, it is necessary to prevent the intervention of the excess flow blocking device, within the dimension constraints imposed by the valve connection to the tank.

SUMMARY OF THE INVENTION

The object of the present invention is to provide a valve for methane which meets the above requirements.

BRIEF DESCRIPTION OF THE DRAWINGS

The features and advantages of the valve or methane according to the present invention will appear more clearly from the following description, made by way of an indicative and non-limiting example with reference to the accompanying figures, in which:

FIG. 1 shows a valve for methane according to an embodiment of the present invention, according to a first observation point;

FIG. 2 shows the valve in FIG. 1, according to a further observation point;

DETAILED DESCRIPTION OF THE PREFERRED EMBODIMENTS

Figure 3:
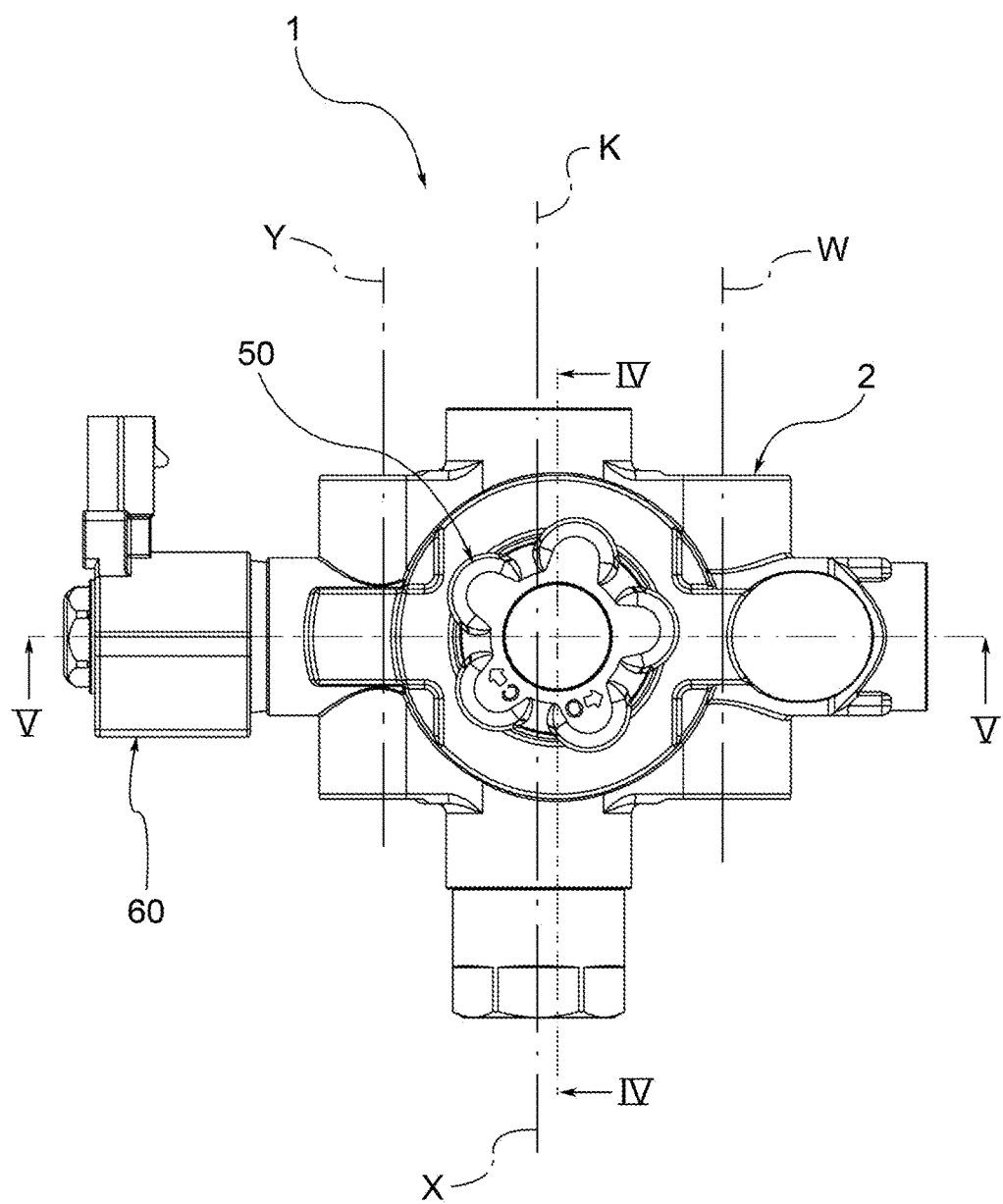
FIG. 3 shows a plan view of the valve in FIG. 2.

With reference to the accompanying figures, reference numeral 1 globally denotes a valve applicable to a tank (not shown) for controlling the flow of methane in automotive systems. Usually, the tank is installed on board a vehicle and the methane therein is stored at high pressure. The valve is permanently applied to the mouth of such a tank, except in case of extraordinary maintenance.

Valve 1 comprises a valve body 2, preferably made in one piece, for example of a metal material such as brass, aluminium and the like.

The valve body 2 comprises in particular a neck 4, preferably threaded, for example externally, for screwing with the mouth of the tank, and a tank duct 6 made through neck 4, for the transit of methane into the internal chamber of the tank in a filling step of the tank and from the tank in an emptying step, in case of intervention of a thermal safety device.

Preferably, the tank duct 6 extends along a rectilinear attachment axis Z and ends in a plurality of main apertures 8, for example shaped as windows that follow one another circumferentially, placed through the side wall of neck 4, for the transit of the gas.

Moreover, the valve body 2 comprises an entry duct 10, which extends along a rectilinear entry axis X, for the entry of methane during refueling.

In particular, the entry duct 10 is adapted for connection with a charging pipe, upstream of which the user can insert the filler to supply the methane.

In one embodiment variant, valve 1 comprises a non-return device 12, arranged between the entry duct 10 and the tank duct 6 and preferably housed in the entry duct 10.

The non-return device 12 is sensitive to the pressure of the methane being charged and is adapted to switch from an open configuration, in which it allows the transit of the methane from the entry duct 10 to the tank duct 6, to a closed configuration, in which it prevents the transit of the methane from the tank duct 6 to the entry duct 10.

In other words, the non-return device 12 prevents the return of the methane rising from the tank duct 6 toward the entry after refueling.

Preferably, moreover, the valve body 2 comprises an auxiliary tank duct 14 intended to be connected to a further tank to increase the autonomy of the vehicle.

Preferably, the auxiliary tank duct 14 extends along an auxiliary attachment axis K, for example coaxial with the entry axis X.

Moreover, the valve body 2 includes a delivery duct adapted to be connected with the vehicle engine to supply it with methane.

Preferably, the delivery duct 20 extends along a rectilinear delivery axis Y, for example distinct from and parallel to the entry axis X and, if provided, to the auxiliary tank axis K.

Valve 1 further comprises a feed duct 30 connected upstream with the internal chamber of the tank and downstream with the delivery duct 20, fluidically separate from the tank duct 6.

In particular, the feed duct 30 comprises a by-pass duct 32, placed within the tank duct 6, separate from said tank duct 6; for example, the by-pass duct 32 is defined by a by-pass tube 34 housed in the tank duct 6, preferably coaxial to said tank duct 6.

The feed duct 30 further comprises, preferably, an auxiliary passage 36 made in the valve body 2, connectable upstream with the by-pass duct 32 and connectable downstream with the delivery duct 20.

Preferably, between the by-pass duct 32 of the feed duct 30 and the auxiliary passage 36, the valve body 2 has a closure seat 38 and, a valve seat 40 between the auxiliary passage 36 and the delivery duct 6.

Preferably, valve 1 comprises a manual tap 50, applied to the valve body 2, adapted to be manipulated to engage an obturator body 52 with the closure seat 38 to obstruct, in whole or in part, the transit of the methane from the by-pass duct 32 to the auxiliary passage 36 (and thus to the delivery duct 20).

Preferably, tap 50 includes said obturator body 52 and a knob 54, connected to the obturator body by a shaft 56, rotatable by means of knob 54 about a knob axis Q.

According to an embodiment variant, the obturator body 52 is engaged with the walls of a seat formed in the valve body 2, which form a translation guide for said obturator body 52, so as to be translatable along said knob axis Q.

Shaft 56 is connected to the obturator body 52 by means of a thread.

By rotating knob 54 and this shaft 56, the obturator body 52, constrained by the translation guide, carries out a translational approach (closing) or distancing (opening) movement only from the obturator seat 38.

Such a manual closing operation is necessary to perform maintenance operations downstream of valve 1. Advantageously, the system adopted in this variant, which provides only a translatory movement of the obturator body, prevents damage to the obturator seat to ensure an excellent seal even at high pressures of the gas and also after frequent use of the tap.

In normal operation, tap 50 is clearly open and the transit of methane from the by-pass conduit 32 to the auxiliary passage 36 is free.

Moreover, valve includes an electrovalve 60, applied to the valve body, adapted to be operated remotely, electronically, to adjust the methane flow to the delivery duct 20, for example depending on the on or off condition of the engine, or more generally on the controls from the vehicle electronic control unit.

To this end, an obturator body 62 of electrovalve 60 cooperates with the valve seat 40 to choke the methane flow to the delivery duct 20.

Valve 1 further includes an excess flow blocking device 70 operating upstream of the feed duct 30, and in particular upstream of the by-pass duct 32 thereof, and downstream of the main aperture 8 of the tank duct 6 towards the internal chamber of the tank.

The blocking device 70 is adapted to stop the transit of methane to the feed duct 30 in the presence of a methane flow exceeding a predefined threshold value.

On the pother hand, under normal operating conditions, the blocking device 70 allows the methane flow from the internal chamber of the tank to the feed duct 30.

For example, such a blocking device 70 is actuated when, due to a rupture of a tube downstream of the delivery duct 20, there is an increased methane flow that escapes.

According to a preferred embodiment, the blocking device 70 includes a tang 72 applied to the valve body 2, e.g. by screwing, upstream of the main apertures 8 and upstream of the feed duct 30. In particular, tang 72 is sealingly connected to tube 34 of the by-pass duct 32.

Tang 72 is further provided with at least one secondary aperture 74, preferably a plurality arranged circumferentially through the side wall, made through the side wall to allow the gas flow from the tank to the feed duct 30.

Tang 70 is provided with an axially through internal cavity 76 (along the attachment axis Z), with which the secondary apertures 74 are in communication.

Device 70 further includes a blocking obturator 78, translatable in the inner cavity 76, and at least one elastic element 79 in compression between the blocking obturator 78 and tang 72.

The blocking obturator 78 has a head 78a provided with a through hole 78b through which a part of the methane flows towards the feed duct 30.

The blocking obturator 78 leaves the secondary apertures 74 normally open by virtue of the action of the elastic element 79. On the other hand, when the methane flow increases beyond a predetermined threshold, and therefore also the part of flow that crosses the through hole 78b increases, the fluid action overcomes the action of the elastic element 79 and makes the obturator close the secondary apertures 74. The passage of methane to the feed duct 30 is therefore reduced to just the amount that can pass through the through hole 78b.

Preferably, the blocking device 70 and in particular tang 70 has radial dimensions such as to be contained inside the imaginary lateral surface which externally delimits neck 4 of the valve body.

Moreover, preferably, the blocking device 70 is placed externally to the valve body 2 and in particular, immediately outside neck 4.

Moreover, the valve body 2 includes a discharge duct in communication downstream with the external environment and connectable upstream with the tank duct 6 and, in the variants provided with the auxiliary tank duct 14, with said auxiliary tank duct 14.

The discharge duct 80 extends along a rectilinear discharge axis W, for example parallel to the delivery axis Y and/or to the auxiliary attachment axis K.

According to an embodiment example, the entry axis X, the discharge axis W and the delivery axis Y, and the auxiliary attachment axis K where provided, are co-planar, i.e. lying on a same imaginary plane of the axes.

For example, said imaginary plane of the axes is orthogonal to the attachment axis Z of the tank duct 6.

According to the invention, valve 1 further comprises a temperature-sensitive thermal safety device 90 operating between the tank duct 6 and the discharge duct 80 and adapted, in a closed configuration, to prevent the transit of methane from the tank duct 6 to the discharge duct 80 and in an open configuration, to allow the transit of methane from the tank duct 6 to the discharge duct 80.

The thermal safety device 90 is adapted allow the discharge of methane from the tank duct 6 to the discharge duct 80 (i.e. towards the external environment) when the outside temperature exceeds a predefined threshold value and prevent such a discharge.

For example, the thermal safety device 90 includes a temperature-sensitive element that, above a predefined temperature value, melts or breaks.

Figure 4:
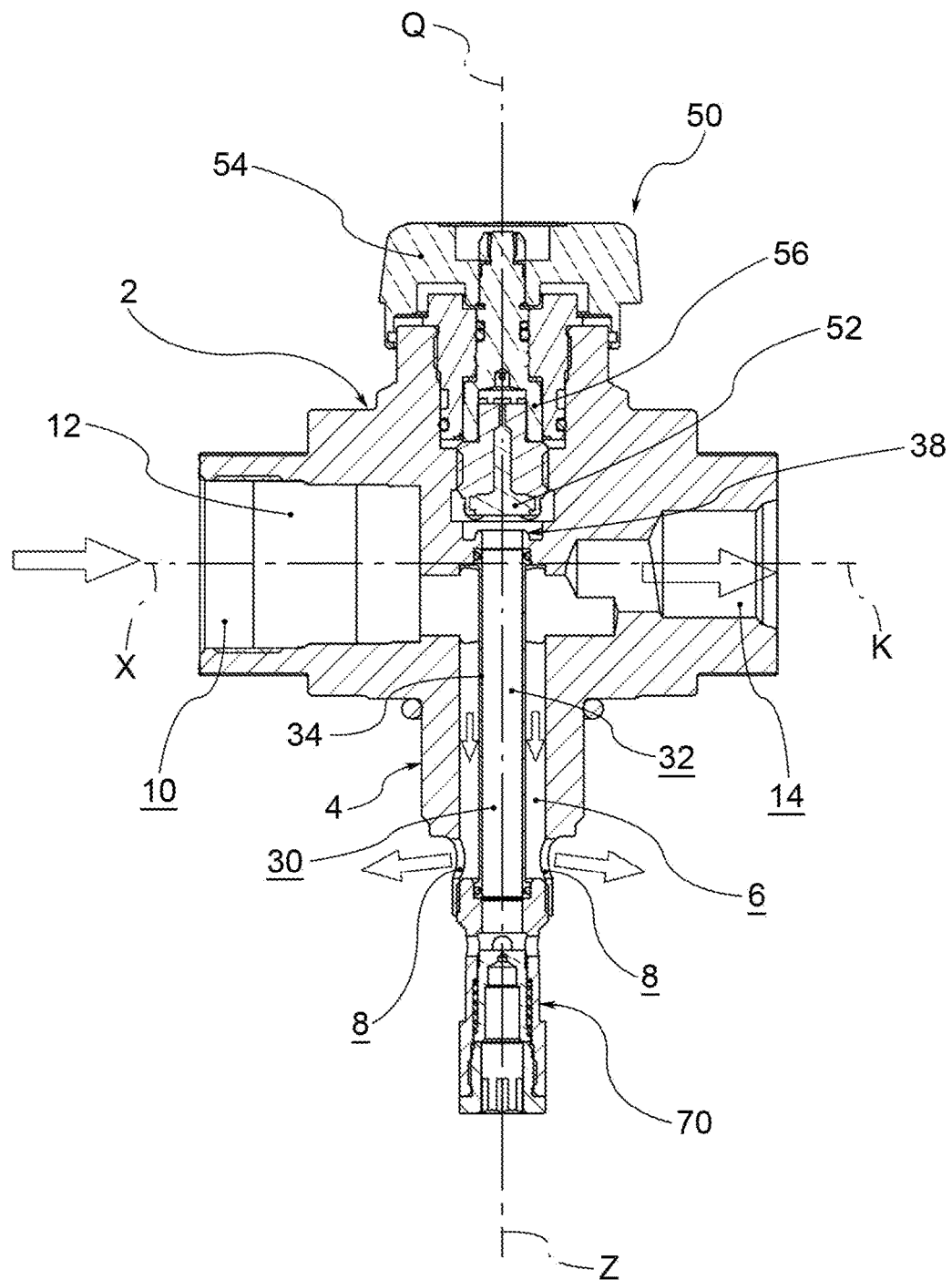
FIG. 4 shows a sectional view of the valve in FIG. 2, according to the sectional plane IV-IV in FIG. 3, with an indication of the gas flow during the filling of the tank.

In a configuration of supply of the tank (for example, shown in FIG. 4), the methane enters the valve body 2 through the entry duct 10; the non-return device 12, if provided, by the action of the methane, switches to an open configuration and the methane flows from the entry duct 10 to the tank duct 6, entering the inner chamber of the tank through the main apertures 8.

Likewise, in the presence of the auxiliary tank duct 14, the methane flows from the entry duct 10 to the auxiliary tank duct 14.

At the end of the supply, the action of the methane under pressure acts on the non-return device 12, if provided, switching it to the closed configuration and thus preventing the methane from escaping to the external environment.

If the engine is stationary, the electrovalve 60 intercepts the valve seat 40, whereby access to the delivery duct 20 is blocked. Moreover, the thermal safety device 90 is in the closed configuration and access to the discharge duct 80 is blocked. Finally, tap 50 is in the open configuration but this does not cause any escape of methane since the electrovalve is in the closed configuration.

Figure 5:
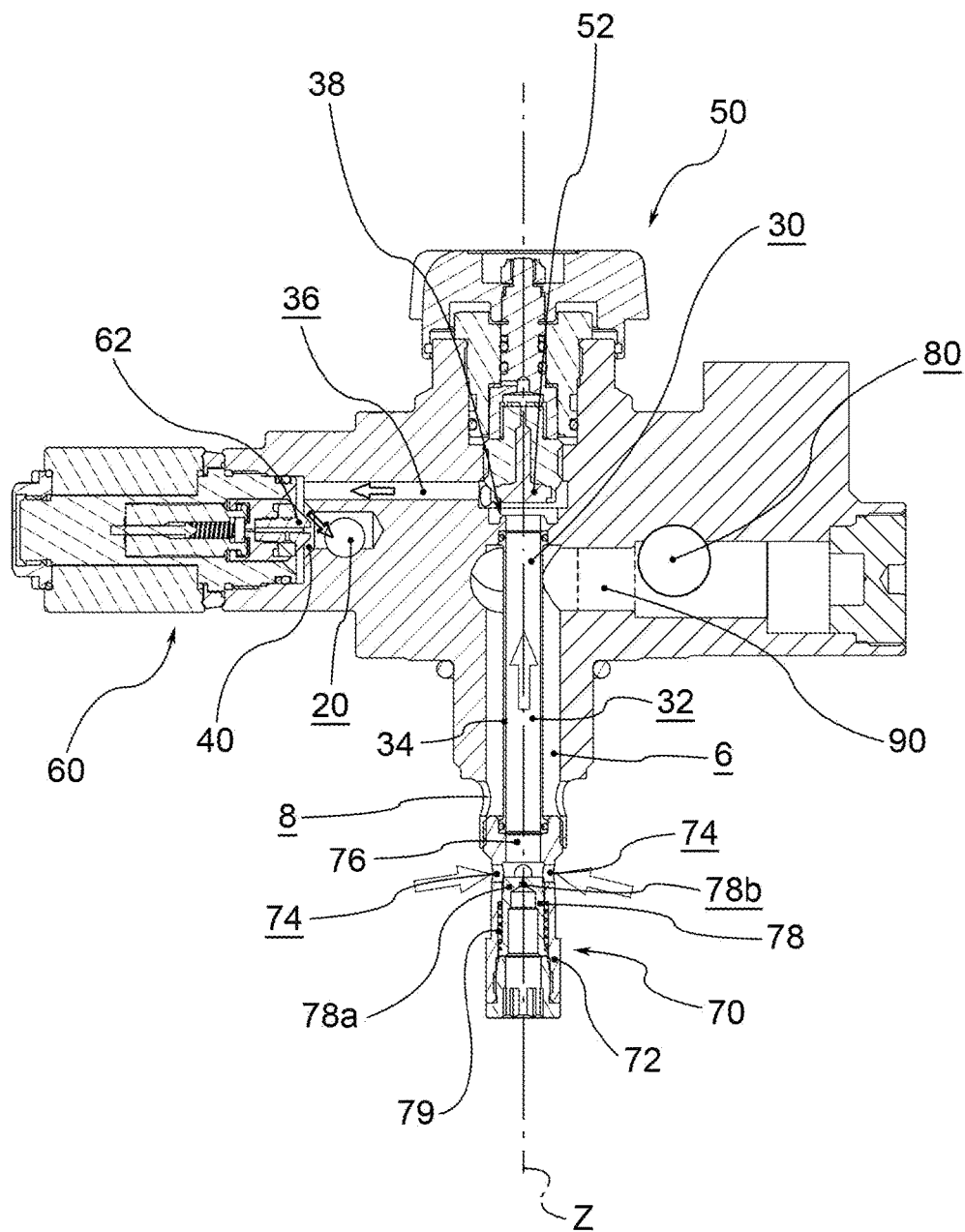
FIG. 5 shows a sectional view of the valve in FIG. 2, according to the sectional plane V-V in FIG. 3, in a normal operating configuration.

In a normal operating configuration (FIG. 5), following the ignition of the vehicle's engine, electrovalve 60 switches to an open configuration in which the obturator body 62 is separated from the valve seat 40 and allows the transit of methane to the discharge duct 20.

The methane flows from the inner chamber of the tank through the secondary apertures 74 towards the feed duct 30, and in particular it flows through the by-pass duct 32, the closure seat 38, the auxiliary passage 36, to reach the delivery duct 20.

Figure 6:
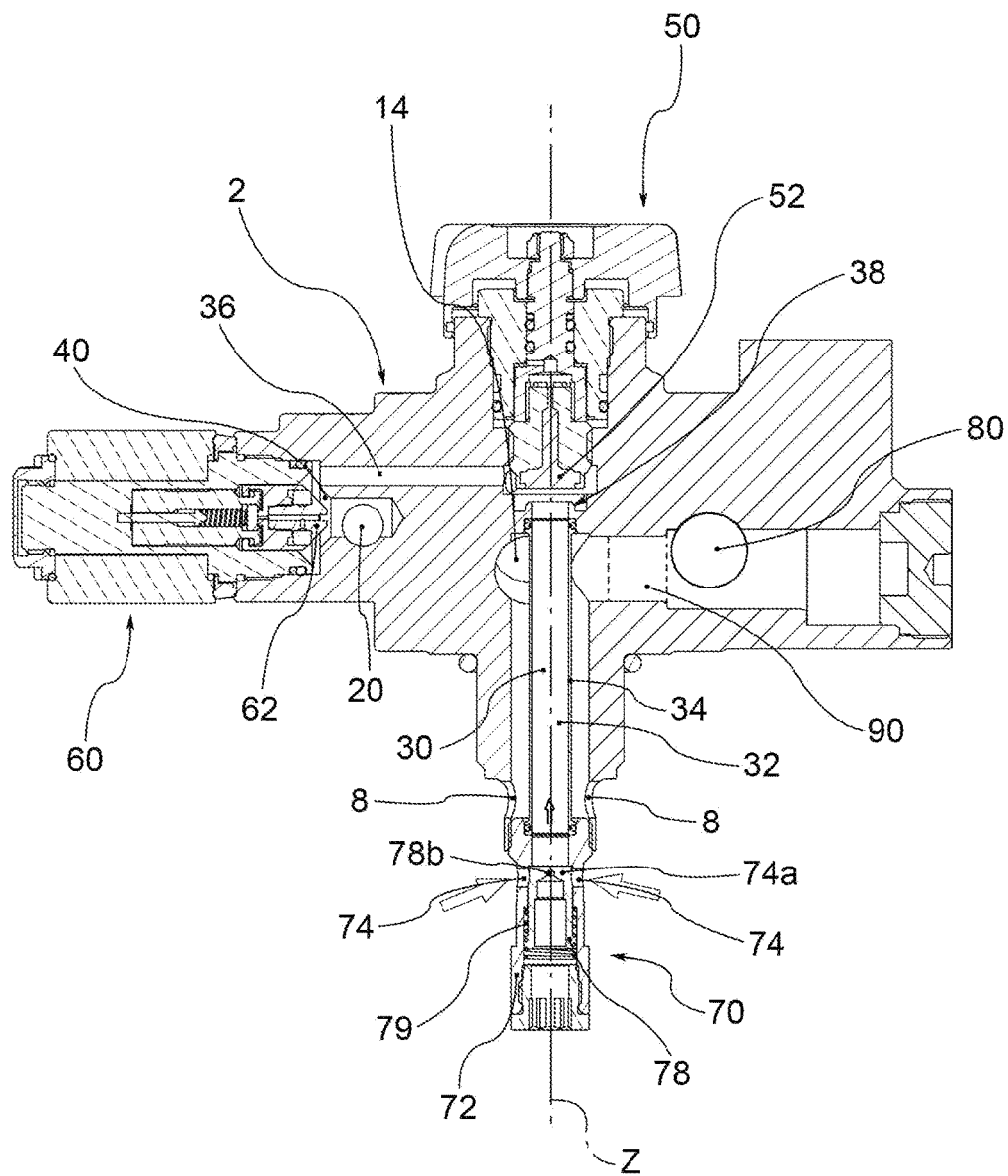
FIG. 6 shows a sectional view of the valve in FIG. 2, according to the sectional plane V-V in FIG. 3, in a configuration of intervention of an excess flow blocking device.
Figure 7:
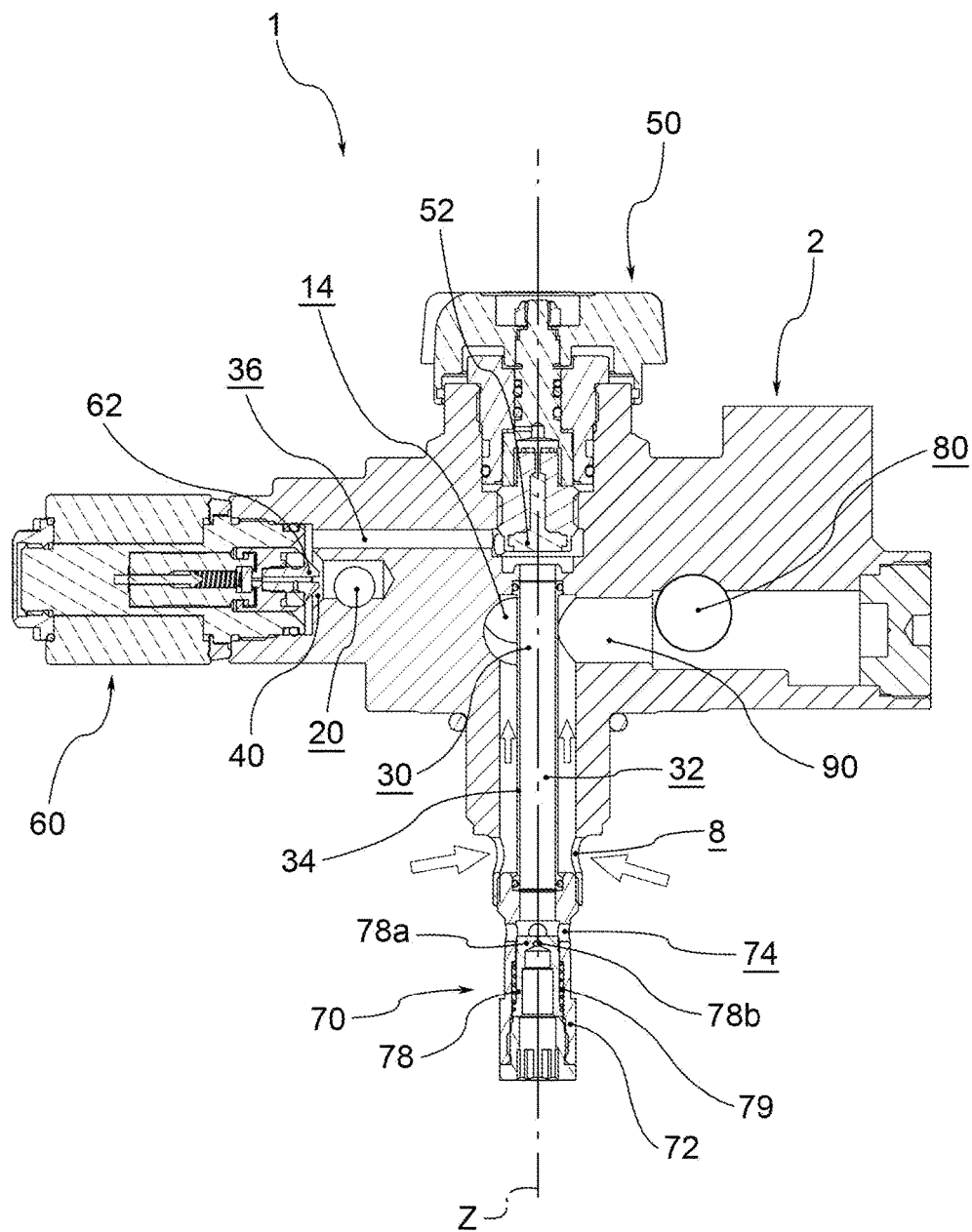
FIG. 7 shows a sectional view of the valve in FIG. 2, according to the sectional plane V-V in FIG. 3, in a configuration of intervention of a thermal safety device (quick discharge condition).

If the methane flow to the delivery duct 20 exceeds a predefined threshold value, such as due to a broken failure of the pipes downstream of the valve, the excess flow blocking device 70, sensitive to the flow of methane to the feed duct 30, normally open, switches to the closed configuration, choking the flow of methane from the inner chamber of the tank to the feed duct 30 (FIG. 6).

The methane flow towards the delivery duct is thus chocked.

If the temperature of the external environment rises beyond a predefined threshold value, for example due to a fire, the thermal safety device 90, normally closed, switches to the open configuration, opening access to the discharge duct 80.

The methane contained in the inner chamber of the tank is discharged through the main apertures 8 of the tank duct 6, flowing through said tank duct 6 and reaching the discharge duct 80, connected with the external environment.

In this condition, despite the high flow of methane through the tank duct 6, the blocking device 70 operating upstream of the main apertures 8 of the tank duct 6 and sensitive to the flow towards the feed duct 30 which, for example thanks to tube 34, is separate from the tank duct 6, does not block the discharge and thus does not impair the safety conditions.

Innovatively, the valve for methane described above meets the requirements mentioned with reference to the control of high-capacity tanks and overcomes the drawbacks of encumbrance of the prior art with regard to the discharge in short times.

In particular, advantageously, the valve according to the invention provides a tank duct of considerable size, such as to allow a very quick gas discharge when the thermal safety device intervenes, and a quick refueling. It is therefore particularly adapted to control very large tanks. At the same time, the overall external dimensions of the neck of the valve body are small in order to limit mechanical stress, particularly significant in the light of the storage pressures of the gas.

It is clear that a man skilled in the art can make changes to the valve described above, all falling within the scope of protection as defined in the following claims.

The invention claimed is:

1. Valve for controlling flow of methane in automotive systems, the valve being adapted for a tank and comprising:
   a valve body including a tank duct ending in at least one main aperture, an entry duct, a delivery duct and a discharge duct;
   a thermal safety device, operating between the tank duct and the discharge duct and normally closed to obstruct passage of methane between the tank duct and the discharge duct, adapted to switch to an open configuration if external temperature exceeds a predefined threshold value;
   a blocking device, operating upstream of the delivery duct, adapted to switch to a closed configuration in which the blocking device chokes the passage of methane towards the delivery duct if the flow of methane exceeds a predefined threshold value, and normally open, the blocking device being positioned upstream of the main aperture of the tank duct;
   a feed duct fluidically separate from the tank duct, connectable downstream with the delivery duct;
   wherein the blocking device is operative upstream of the feed duct and is responsive to the flow of methane through the feed duct, and
   wherein the feed duct comprises a by-pass duct inside the tank duct.

2. Valve according to claim 1, wherein the by-pass duct is delimited by a tube housed in the tank duct.

3. Valve according to claim 2, wherein the tube is coaxial to the tank duct.

4. Valve according to claim 1, wherein the valve body comprises a neck and the tank duct is made through the neck.

5. Valve according to claim 4, wherein a width of the blocking device is narrower than a width of the neck of the valve body.

6. Valve according to claim 4, wherein the blocking device is positioned externally to the valve body, in a position axially alongside the neck.

7. Valve according to claim 1, wherein the feed duct further comprises an auxiliary passage, connectable upstream with the by-pass duct and connectable downstream with the delivery duct, and wherein a closure seat is present between the by-pass duct and the auxiliary passage engageable by a manual tap, and wherein a valve seat is present between the auxiliary passage and the delivery duct engageable by a remote control electrovalve.

8. Valve according to claim 7, wherein the auxiliary passage, the closure seat and the valve seat are made in the valve body.

9. Valve according to claim 7, wherein the tap comprises an obturator body and a shaft manually rotatable around a knob axis, wherein the obturator body is engaged with a translation guide and the shaft is connected to the obturator body by a thread, so that the obturator body is only translatable along the knob axis by rotation of the shaft to engage or disengage the obturator seat.

10. Valve according to claim 1, comprising a non-return device, operating between the entry duct and the tank duct and normally closed to obstruct an exit of methane through the entry duct and adapted to switch to an open configuration by action of the methane in supply.

11. Valve according to claim 1, comprising an auxiliary tank duct.

12. Valve according to claim 1, wherein the valve body is made in one piece.

13. Valve according to claim 12, wherein the valve body is of bronze or aluminium.

* * * * *